United States Patent
Park et al.

(10) Patent No.: US 9,542,094 B2
(45) Date of Patent: Jan. 10, 2017

(54) METHOD AND APPARATUS FOR PROVIDING LAYOUT BASED ON HANDWRITING INPUT

(71) Applicant: Samsung Electronics Co., Ltd., Gyeonggi-do (KR)

(72) Inventors: Jeong-wan Park, Seoul (KR); Jae-woong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 66 days.

(21) Appl. No.: 14/469,420

(22) Filed: Aug. 26, 2014

(65) Prior Publication Data

US 2015/0055869 A1     Feb. 26, 2015

(30) Foreign Application Priority Data

Aug. 26, 2013  (KR) .................. 10-2013-0101290

(51) Int. Cl.
*G06K 9/00*      (2006.01)
*G06F 3/0488*    (2013.01)

(52) U.S. Cl.
CPC ....... *G06F 3/04883* (2013.01); *G06K 9/00436* (2013.01)

(58) Field of Classification Search
CPC ............ G06F 3/04883; G06K 9/00416; G06K 9/00436
See application file for complete search history.

(56) References Cited

U.S. PATENT DOCUMENTS

| | | | | |
|---|---|---|---|---|
| 6,043,760 A * | 3/2000 | Laakkonen | ............ | H03M 11/06 341/22 |
| 7,280,695 B2 * | 10/2007 | Leung | ................. | G06F 3/04883 382/187 |
| 8,165,404 B2 * | 4/2012 | Matulic | .............. | G06K 9/00442 382/186 |
| 9,025,879 B2 * | 5/2015 | Sugiura | .............. | G06K 9/00416 382/181 |
| 2010/0066691 A1 * | 3/2010 | Li | ........................ | G06F 3/04883 345/173 |
| 2014/0007002 A1 * | 1/2014 | Chang | ................. | G06F 3/04883 715/780 |
| 2014/0096162 A1 * | 4/2014 | Casey | .................. | H04N 21/233 725/61 |
| 2014/0363083 A1 * | 12/2014 | Xia | ..................... | G06K 9/00436 382/189 |
| 2015/0042661 A1 * | 2/2015 | Imoto | ................ | G06K 9/00442 345/467 |

FOREIGN PATENT DOCUMENTS

KR    10-2009-0098266     9/2009

* cited by examiner

*Primary Examiner* — Daniel Mariam
(74) *Attorney, Agent, or Firm* — The Farrell Law Firm, P.C.

(57) ABSTRACT

A method and an apparatus are provided for providing a layout based on a handwriting input. A first input is received from a user. The first input includes handwriting data. A layout is created based on the handwriting data. A second input is received from the user. Content of the second input is arranged in the created layout.

12 Claims, 6 Drawing Sheets

METHOD AND APPARATUS FOR PROVIDING LAYOUT BASED ON HANDWRITING INPUT

PRIORITY

This application claims priority to Korean Patent Application No. 10-2013-0101290, filed on Aug. 26, 2013, in the Korean Intellectual Property Office, the content of which is incorporated herein by reference.

BACKGROUND OF THE INVENTION

1. Field of the Invention

The present invention relates generally to a method and an apparatus for providing a layout for a terminal, and more particularly, to a method and an apparatus for providing a layout based on a handwriting input.

2. Description of the Related Art

A layout is a format for effectively arranging components such as characters, pictures, symbols, photographs, and the like, in a restricted space for design, advertising, or editing.

In order to conveniently arrange images or characters, methods of arranging specific images in a fixed layout of an album format, such as, for example, photostory albums, have been used.

However, while such methods of arranging images in a fixed layout or a limited number of layouts are convenient, they do not allow the free arrangement of characters or images to be displayed in a format desired by a user.

SUMMARY OF THE INVENTION

The present invention has been made to address at least the above problems and/or disadvantages and to provide at least the advantages described below. Accordingly, an aspect of the present invention provides a method and an apparatus for providing a layout based on a handwriting input, whereby a user may use handwriting to designate a layout for representing input content.

According to an aspect of the present invention, a method is provided for providing a layout based on a handwriting input. A first input is received from a user. The first input includes handwriting data. A layout is created based on the handwriting data. A second input is received from the user. Content of the second input is arranged in the created layout.

According to another aspect of the present invention, an apparatus is provided for providing a layout based on a handwriting input. The apparatus includes a memory and a processor coupled to the memory. The processor includes a first reception unit for receiving a first input from a user. The first input includes handwriting data. The processor also includes a layout creation unit for creating a layout based on the handwriting data. The processor further includes a second reception unit for receiving a second input from the user. The processor additionally includes a content arrangement unit for arranging content of the second input in the created layout.

According to a further aspect of the present invention, an article of manufacture is provided for providing a layout based on a handwriting input. The article of manufacture includes a non-transitory computer-readable storage medium having stored therein program instructions, which when executed implement the steps of: receiving a first input from a user, the first input including handwriting data; creating a layout based on the handwriting data; receiving a second input from the user; and arranging content of the second input in the created layout.

BRIEF DESCRIPTION OF THE DRAWINGS

The above and other aspects, features, and advantages of the present invention will be apparent from the following detailed description, when taken in conjunction with the accompanying drawings, in which.

DETAILED DESCRIPTION OF EMBODIMENTS OF THE PRESENT INVENTION

Figure 1:
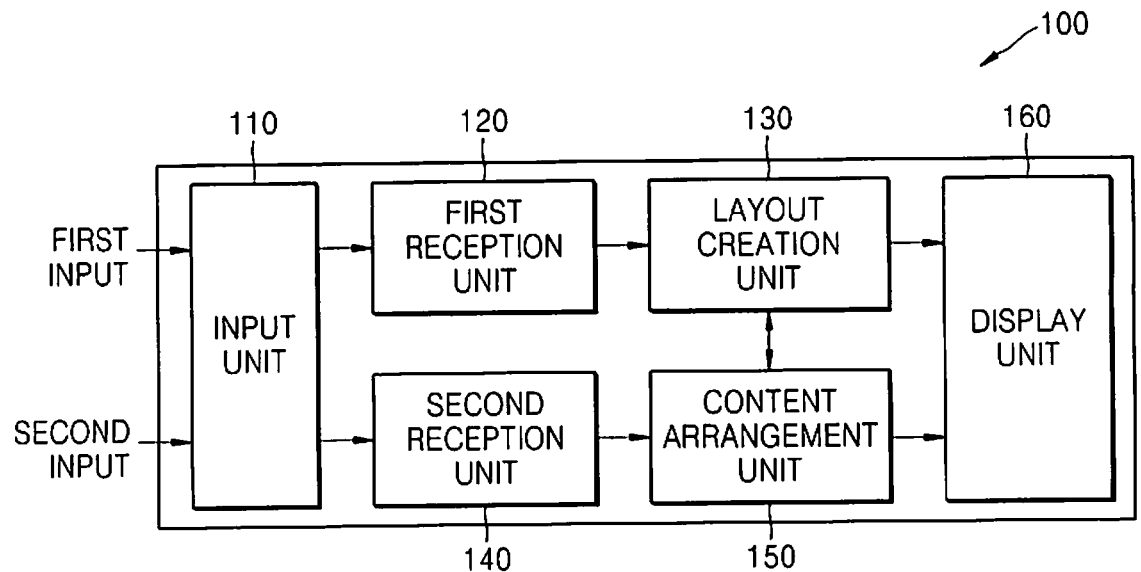
FIG. 1 is a block diagram illustrating an apparatus for providing a layout based on a handwriting input, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, a method of manufacturing and using the present invention will be described in detail. In addition, terms such as " . . . unit" or "module," disclosed in the specification indicates a unit for processing at least one function or operation, and this may be implemented by hardware, software, or a combination thereof.

Herein, "an embodiment" of the principles of the present invention and various modifications of this expression indicate that a specific feature, structure, and characteristic related to the embodiment are included in at least one embodiment of the principles of the present invention. Thus, the expression "in an embodiment" and arbitrary other modifications disclosed in the entire specification do not necessarily indicate the same embodiment.

As used herein, the term "and/or" includes any and all combinations of one or more of the associated listed items.

FIG. 1 is a block diagram illustrating an apparatus for providing a layout based on a handwriting input, according to an embodiment of the present invention.

Referring to FIG. 1, an apparatus 100 includes an input unit 110, a first reception unit 120, a second reception unit 140, a layout creation unit 130, a content arrangement unit 150, and a display unit 160.

The apparatus 100 of FIG. 1 includes only components related to the present embodiment of the present invention. Therefore, it will be understood by those of ordinary skill in the art that other general-use components may be further included in addition to the components shown in FIG. 1.

According to an embodiment of the present invention, the input unit 110 may receive an input such as a key input or handwriting data from a user. The input unit 110 may include various input devices, such as, for example, a touch panel, a key button, and the like, thereby allowing the user to input desired information. For example, the input unit 110 may recognize handwriting data inputted by the user by hand or a touch pen, or may receive an input corresponding to a character indicated by a key displayed on a touch pad.

According to an embodiment of the present invention, the first reception unit 120 receives a first input from the user, where the first input including handwriting data. The received handwriting data may be obtained by recognizing a character, a symbol, or a picture.

According to another embodiment of the present invention, the first reception unit 120 receives (or obtains) a handwriting input sequence from the user. For example, when the user inputs handwriting data through the input unit 110, the first reception unit 120 may receive not only the handwriting data, but also a handwriting sequence.

The received handwriting input sequence may be used when content is arranged in a layout, or when a video, in which a figure of arranging the content in the layout is displayed, is created.

According to an embodiment of the present invention, the layout creation unit 130 creates a layout based on the received handwriting data. According to another embodiment of the present invention, the layout creation unit 130 beautifies the received handwriting data and create a layout based on the beautified handwriting data. The layout may indicate a format for effectively arranging components such as, for example, characters, pictures, symbols, photographs, and the like, in a restricted space for design, advertisement, or editing.

A configuration of beautifying handwriting data is known in the technical field to which the present invention belongs.

According to an embodiment of the present invention, the layout creation unit 130 displays the created layout on the display unit 160. In addition, the created layout may be modified by receiving an input (such as cropping or touch input) for editing the layout displayed on the display unit 160.

According to an embodiment of the present invention, the second reception unit 140 receives a second input from the user. For example, the second input from the user received through the input unit 110 may include handwriting data. Alternatively, according to another embodiment of the present invention, the second input from the user may be a key input.

According to an embodiment of the present invention, the content arrangement unit 150 arranges in the created layout content corresponding to the received second input. The content may be beautified handwriting data corresponding to handwriting data or a character corresponding to a key input.

For example, when the second input from the user is handwriting data, the handwriting data included in the second input may be beautified, and the beautified handwriting data may be arranged in the created layout.

As another example, when the second input from the user is a key input, a character corresponding to the key input may be arranged in the created layout.

When a scale or length of the created layout does not match inputted content, the content may be input again or scaled and arranged in the layout.

According to another embodiment of the present invention, the content arrangement unit 150 sequentially arranges content according to a handwriting input sequence.

According to an embodiment of the present invention, the content arrangement unit 150 displays the content arranged in the layout on the display unit 160.

The display unit 160 includes, for example, a Liquid Crystal Display (LCD), a Light-Emitting Diode (LED) module, or the like, for visually displaying a screen.

Although the apparatus 100 is described as an independent apparatus in this embodiment of the present invention, it is readily understood by those of ordinary skill in the art to which the present invention belongs that the apparatus 100 may be equipped in a terminal, such as, for example, a smartphone, a tablet PC, a laptop computer, or the like, in order to carry out the above-described operations.

A particular operation of the apparatus 100, according to an embodiment of the present invention, is described in detail below with reference to FIGS. 2 to 5.

Figure 2:
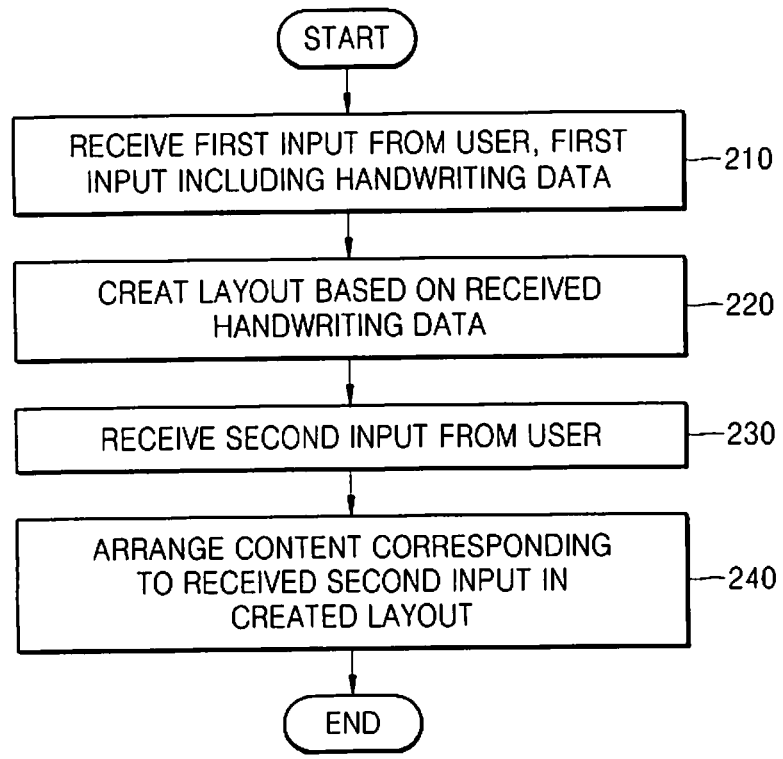
FIG. 2 is a flowchart illustrating a method of providing a layout based on a handwriting input, according to an embodiment of the present invention.

FIG. 2 is a flowchart of a method of providing a layout based on a handwriting input, according to an embodiment of the present invention.

In step 210, the first reception unit 120 receives a first input from the user, where the first user input including handwriting data. The received handwriting data may be data obtained by recognizing a character, a symbol, or a picture.

According to another embodiment of the present invention, the first reception unit 120 receives a handwriting input sequence from the user. For example, when the user inputs handwriting data through the input unit 110, the first reception unit 120 may receive not only the handwriting data but also a handwriting sequence.

In step 220, the layout creation unit 130 creates a layout based on the received handwriting data. According to another embodiment of the present invention, the layout creation unit 130 may beautify the received handwriting data and create a layout based on the beautified handwriting data.

Figure 3:
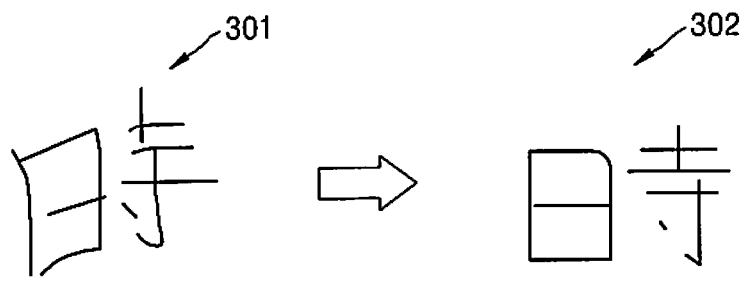
FIG. 3 is a diagram illustrating beautifying of handwriting data, according to an embodiment of the present invention.

For example, FIG. 3 is a diagram illustrating creation of a layout based on received handwriting data, according to an embodiment of the present invention.

Referring to FIG. 3, when the first input received from the user is handwriting data 301 having a character shape of "時", a layout corresponding to the shape of the received handwriting data 301 may be created.

Alternatively, the received handwriting data 301 may be beautified. A layout corresponding to a shape of beautified handwriting data 302 may be created because readability or aesthetics of received handwriting data 301 is frequently low since methods of inputting handwriting data to a mobile terminal usually have limited performance.

Referring back to FIG. 2, in step 230, the second reception unit 140 receives a second input from the user. For example, the second input from the user received through the input unit 110 may include handwriting data. Alternatively, according to another embodiment of the present invention, the second input from the user may be a key input.

In step 240, the content arrangement unit 150 arranges the created layout content corresponding to the received second input. The content may be beautified handwriting data corresponding to handwriting data or a character corresponding to a key input.

Figure 4:
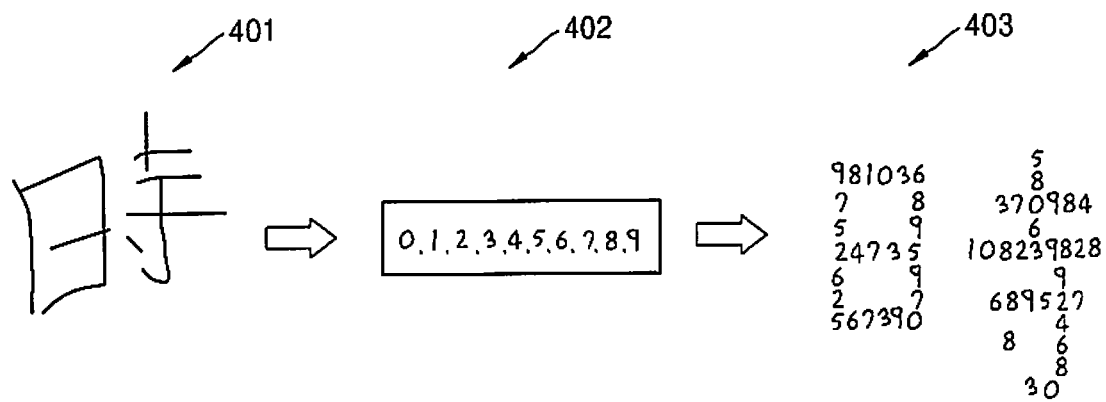
FIG. 4 is a diagram illustrating arranging of content in a layout based on a handwriting input, according to an embodiment of the present invention.

FIG. 4 is a diagram illustrating arranging of content in a layout based on a handwriting input, according to an embodiment of the present invention.

Referring to FIG. 4, the apparatus 100 receives handwriting data 401 having a shape of "時" based on a first input from the user, and creates a layout based on the received handwriting data 401. The created layout may have a format of the beautified handwriting data 302 of FIG. 3).

Thereafter, the apparatus 100 receives as an input content to be arranged in the layout based on a second input from the user. For example, as shown in FIG. 4, numbers 402 may be inputted. A handwriting input or a key input from the user may be used as a method of inputting the numbers 402.

When the content to be arranged in the layout is inputted, the apparatus 100 arranges the inputted content in the created layout 403. When a scale or length of the created layout does not match the inputted content, the content may be input again or scaled and arranged in the layout.

According to another embodiment of the present invention, the apparatus 100 may receive not only handwriting data, but also a handwriting input sequence, when a first input including the handwriting data for a layout is received.

Therefore, the apparatus 100 sequentially arranges the inputted content in the created layout according to the handwriting input sequence of the user.

For example, when a handwriting input sequence of the handwriting data 401 inputted for a layout is a handwriting sequence of the Chinese character "時", and the inputted content 402 is "9, 7, 5, 2, 6, 2, 5, 8, 1, 0, 3, 4, 7, 3, 6, 7, 3, 9 . . . 4, 6, 8, 0, 3, 8", the content 402 may be arranged in the layout 403, as shown in FIG. 4.

Figure 5:
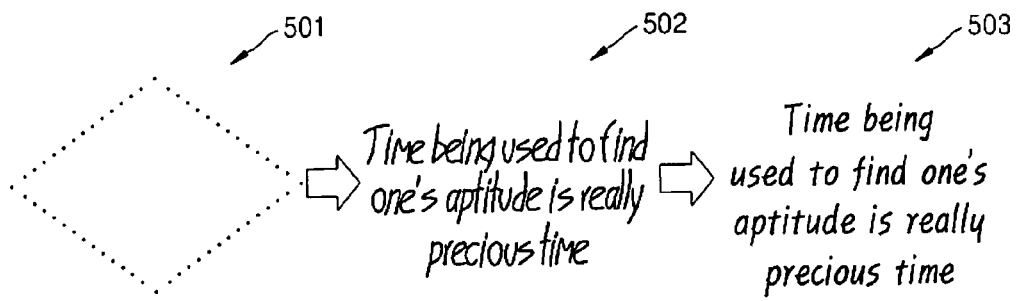
FIG. 5 is a diagram illustrating arranging of content in a layout based on a handwriting input, according to another embodiment of the present invention.

FIG. 5 is a diagram illustrating arranging of content in a layout based on a handwriting input, according to another embodiment of the present invention.

Referring to FIG. 5, the apparatus 100 receives handwriting data "◇" 501 based on a first input from the user, and creates a layout based on the received handwriting data 501. An operation of beautifying the handwriting data 501 received through the first input may be further performed.

Thereafter, the apparatus 100 receives as an input content to be arranged in the layout, based on a second input from the user. For example, as shown in FIG. 5, the second input including handwriting data 502 is received. In this case, an operation of beautifying the handwriting data 502 received through the second input may be further performed as well.

When the content to be arranged in the layout is inputted, the apparatus 100 arranges the inputted handwriting data (or beautified handwriting data) 502 in the created layout 503. When a scale or length of the created layout does not match the inputted content, the content may be scaled and arranged in the layout as shown in FIG. 5.

Figure 6:
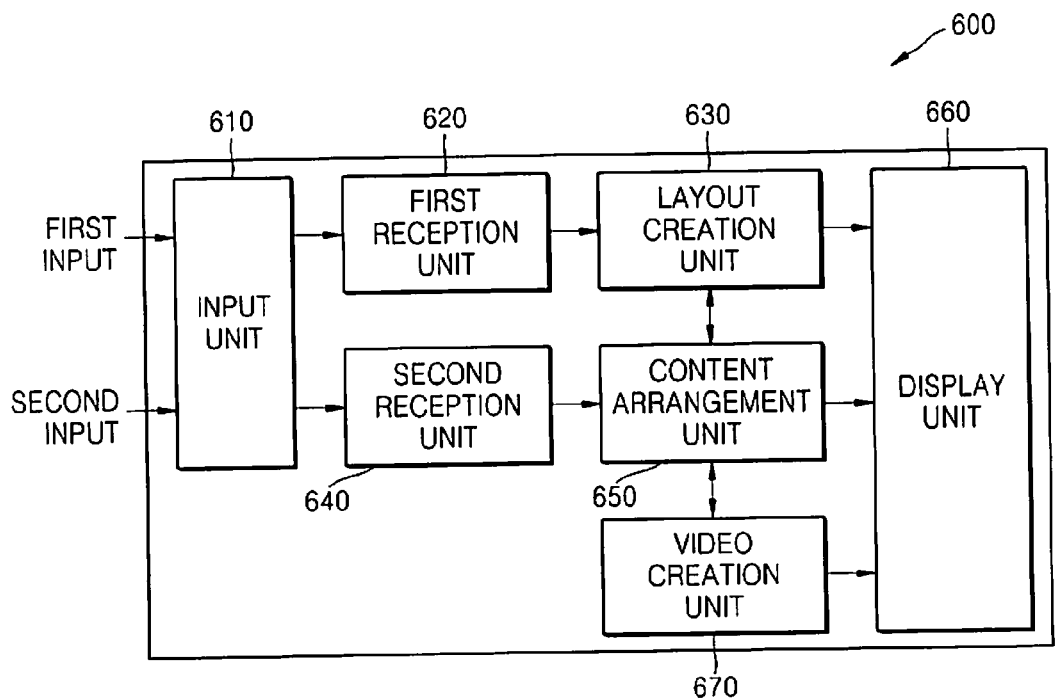
FIG. 6 is a block diagram illustrating an apparatus for providing a layout based on a handwriting input, according to another embodiment of the present invention.

FIG. 6 is a block diagram illustrating an apparatus for providing a layout based on a handwriting input, according to another embodiment of the present invention.

Referring to FIG. 6, an apparatus 600 includes an input unit 610, a first reception unit 620, a second reception unit 640, a layout creation unit 630, a content arrangement unit 650, a video creation unit 670, and a display unit 660.

The apparatus 600 of FIG. 6 is similar to the apparatus 100 of FIG. 1, and thus, only differences therebetween will be mainly described below. Specifically, the input unit 610 is similar to the input unit 110, the first reception unit 620 is similar to the first reception unit 120, the layout creation unit 630 is similar to the layout creation unit 130, the second reception unit 640 is similar to the second reception unit 140, the content arrangement unit 650 is similar to the content arrangement unit 150, and the display unit 660 is similar to the display unit 160.

The video creation unit 670 creates a video from content arranged in a layout by the content arrangement unit 650. Specifically, the video creation unit 670 may create a video in which a figure of arranging inputted content in a created layout is displayed.

For example, the video creation unit 670 may create a video in which content arranged in a layout is sequentially displayed according to a random condition.

As another example, the video creation unit 670 may create a video in which content arranged in a layout is sequentially displayed according to a handwriting input sequence. The handwriting input sequence indicates an input sequence of handwriting data inputted by the first reception unit for creating the layout.

As another example, the video creation unit 670 may create a video in which content is gradually arranged in a layout from a state where the content is scattered according to the random condition.

Examples in which the video creation unit 670 creates a video of arranging inputted content in a created layout is described in detail below with reference to FIGS. 8 and 9.

Figure 7:
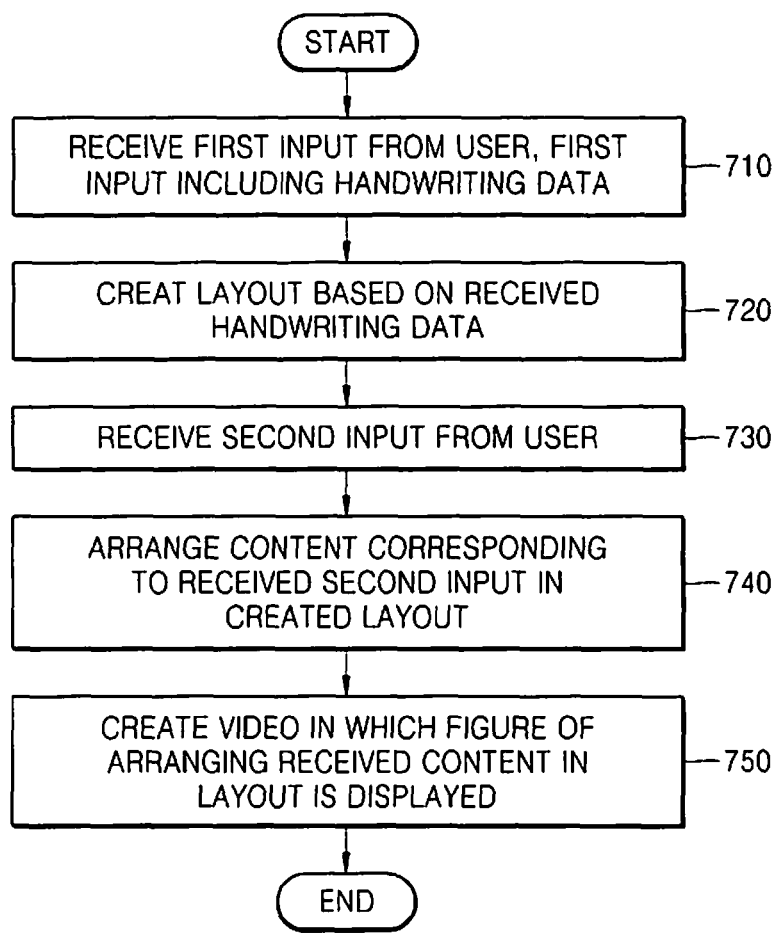
FIG. 7 is a flowchart illustrating a method of providing a layout based on a handwriting input, according to another embodiment of the present invention.

FIG. 7 is a flowchart of a method of providing a layout based on a handwriting input, according to another embodiment of the present invention.

The method of FIG. 7 is similar to the method shown in FIG. 2, and thus, a difference therebetween is described in detail below.

Referring to FIG. 7, in step 710, the first reception unit 620 receives a first input from a user, where the first input including handwriting data. The first reception unit 620 may also receive a handwriting input sequence of the user.

In step 720, the layout creation unit 630 creates a layout based on the received handwriting data.

In step 730, the second reception unit 640 receives a second input from the user. For example, the second input received from the user through the input unit 610 may include handwriting data. Alternatively, according to another embodiment of the present invention, the second input from the user may be a key input.

In step 740, the content arrangement unit 650 arranges content corresponding to the received second input, in the created layout. The content may be beautified handwriting data corresponding to handwriting data or a character corresponding to a key input.

In step 750, the video creation unit 670 creates a video from the content arranged in the layout by the content arrangement unit 650. Specifically, the video creation unit 670 may create a video in which the inputted content is arranged in the created layout.

Figure 8:
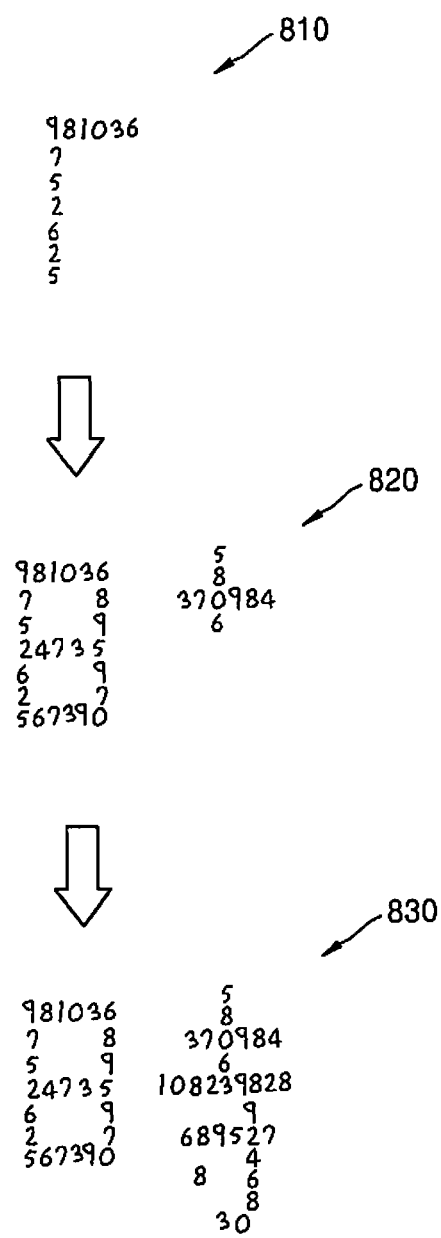
FIG. 8 is a diagram illustrating creation of a video in which content is arranged in a layout based on a handwriting input, according to an embodiment of the present invention.

FIG. 8 is a diagram illustrating creation of a video in which content is arranged in a layout based on a handwriting input, according to an embodiment of the present invention.

Referring to FIG. 8, the apparatus 600 creates a video in which content arranged in a layout is sequentially displayed according to a handwriting input sequence. The handwriting input sequence indicates an input sequence of handwriting data inputted by the first reception unit 620 for creating the layout.

For example, when the handwriting input sequence of the handwriting data inputted for the layout is the Chinese character "時", and the inputted content is "9, 7, 5, 2, 6, 2, 5, 8, 1, 0, 3, 4, 7, 3, 6, 7, 3, 9 . . . 4, 6, 8, 0, 3, 8", the content may be arranged in the layout according to the handwriting input sequence. In addition, the apparatus 600 may create a video in which the content arranged in the layout is sequentially displayed according to the handwriting input sequence, as shown in 810, 820, and 830 of FIG. 8. Although only three screens for the video are shown in FIG. 8 for convenience of description, a video in which characters of the inputted content are sequentially displayed according to the handwriting input sequence may be created.

In addition, although an embodiment of creating a video in which content arranged in a layout is displayed according to a handwriting input sequence has been described with reference to FIG. 8, a video in which content arranged in a layout is sequentially displayed according to a random condition, regardless of an input sequence, may be created according to another embodiment of the present invention.

Figure 9:
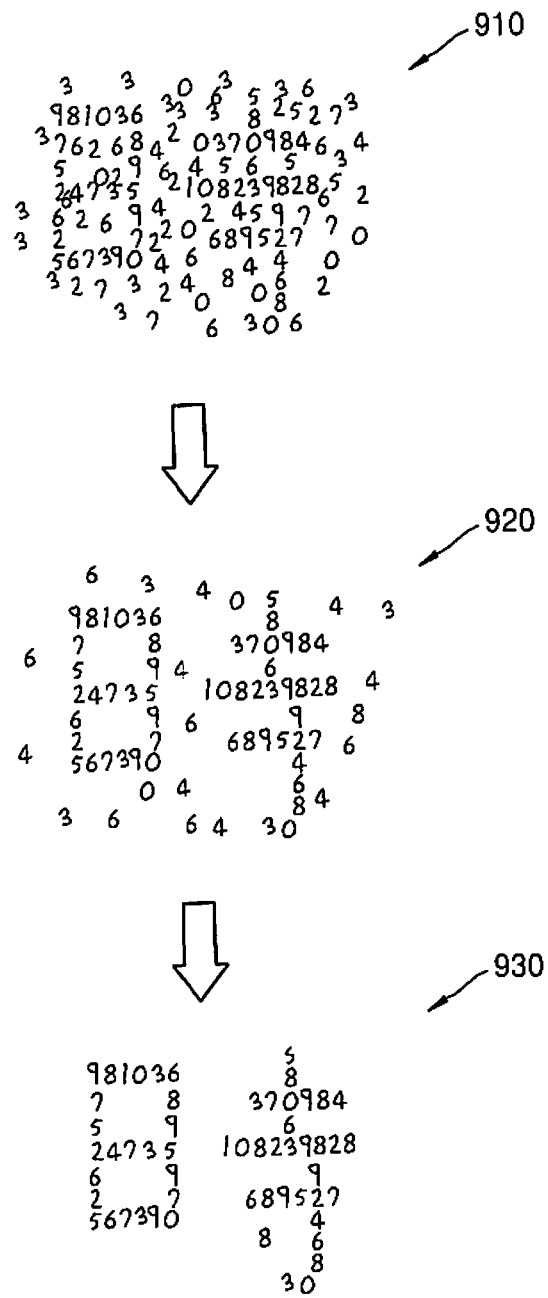
FIG. 9 is a diagram illustrating creation of a video in which content is arranged in a layout based on a handwriting input, according to another embodiment of the present invention.

FIG. 9 is a diagram illustrating creation of a video in which content is arranged in a layout based on a handwriting input, according to another embodiment of the present invention.

Referring to FIG. 9, the apparatus 600 creates a video in which inputted content is gradually arranged in a layout from a state where the inputted content is scattered according to a random condition.

For example, in the video in which inputted content is gradually arranged in a layout from a state where the inputted content is scattered according to the random condition, as shown in FIG. 9, a first state 910 where inputted numbers are scattered according to the random condition is first displayed. Thereafter, the scattered numbers are gradually arranged in the layout in a second state 920. Finally, a screen 930 on which the numbers are completely arranged in the layout may be outputted.

As described above, according to embodiments of the present invention, content inputted by a user may be arranged and displayed in a layout generated by the user through a handwriting input. In addition, the content arranged in the layout may be displayed as a video. Therefore, the content inputted by the user may be represented so as to exhibit aesthetics and artistry, and high interest and satisfaction may be provided to the user.

The embodiments of the present invention can be written as computer-executable programs and can be implemented in general-use digital computers that execute the programs using a computer-readable recording medium. Examples of the computer-readable recording medium include storage media, such as magnetic storage media (e.g., Read Only Memory (ROM), floppy disks, hard disks, etc.) and optical recording media (e.g., Compact Disc (CD)-ROMs, Digital Versatile Discs (DVDs), etc.).

In addition, other embodiments of the present invention can also be implemented through computer-readable code/instructions in/on a medium, e.g., a computer-readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer-readable code is stored/transferred and executed in a distributed fashion. Furthermore, the processing element could include a processor or a computer processor, and processing elements may be distributed and/or included in a single device.

It should be understood that the embodiments of the present invention described herein should be considered in a descriptive sense only and not for purposes of limitation. Descriptions of features or aspects within each embodiment should typically be considered as available for other similar features or aspects in other embodiments of the present invention.

While the invention has been described with reference to certain embodiments thereof, it will be understood by those of ordinary skill in the art that various changes in form and detail may be made therein without departing from the spirit and scope of the invention as defined by the following claims.

What is claimed is:

1. A method of providing a layout based on a handwriting input, the method comprising the steps of:
    receiving a first input from a user, the first input including handwriting data, with the handwriting data being made by drawing one or more lines;
    creating, by a processor, a layout comprising one or more lines, based on the handwriting data;
    receiving a second input from the user; and
    arranging content of the second input by placing the content on the one or more lines so as to form a shape of the created layout wherein the receiving the first input from the user comprises determining a handwriting input sequence of the user; and arranging the content comprises sequentially arranging the content according to the handwriting input sequence.

2. The method of claim 1, wherein creating the layout comprises creating the layout corresponding to a shape of the handwriting data.

3. The method of claim 1, wherein the handwriting data is obtained by recognizing a character, a picture, or a symbolic picture.

4. The method of claim 1, wherein the second input from the user comprises second handwriting data, and arranging the content comprises:
    beautifying the second handwriting data included in the second input; and
    arranging the beautified handwriting data in the created layout.

5. The method of claim 1, wherein the second input from the user comprises a key input, and arranging the content comprises:
    arranging a character corresponding to the key input in the created layout.

6. The method of claim 1, wherein arranging the content comprises:
    receiving the content again or scaling the content; and
    arranging the content received again or the scaled content in the layout.

7. The method of claim 1, further comprising:
    creating a video by using the arranged content; and
    displaying the created video on a display unit.

8. The method of claim 7, wherein creating the video comprises creating the video in which the arranged content is sequentially displayed.

9. An article of manufacture for providing a layout based on a handwriting input, comprising a non-transitory computer-readable storage medium having stored therein program instructions, which when executed implement the steps of claim 1.

10. An apparatus for providing a layout based on a handwriting input, the apparatus comprising:
a memory; and
a processor coupled to the memory and configured to:
receive a first input from a user, the first input including handwriting data, with the handwriting data being made by drawing one or more lines;
create a layout comprising one or more lines, based on the received handwriting data;
receive a second input from the user and determine a handwriting input sequence of the user; and
arrange content of the second input by placing the content on the one or more lines so as to form a shape of the created layout, the content being arranged sequentially according to the handwriting input sequence.

11. The apparatus of claim 10, wherein the processor is further configured to create a video by using the arranged content, and display the created video on a display unit.

12. A method of providing a layout based on a handwriting input, the method comprising the steps of:
receiving a first input from a user, the first input including handwriting data;
creating a layout based on the handwriting data;
receiving a second input from the user; and
arranging content of the second input in the created layout, the content of the second input including a plurality of characters,
wherein the plurality of characters of the content are automatically arranged according to a shape and size of the created layout.

* * * * *